United States Patent
Koehler et al.

(10) Patent No.: US 7,929,125 B2
(45) Date of Patent: Apr. 19, 2011

(54) GIMBALED SYSTEM WITH OPTICAL COUDÉ PATH AND METHOD TRANSFERRING DATA

(75) Inventors: Frederick B. Koehler, Tucson, AZ (US);
William D. Werries, Tucson, AZ (US);
David J. Markason, Tucson, AZ (US);
David G. Anthony, Marana, AZ (US);
Robert Rinker, Tucson, AZ (US);
Thomas E. Roberts, Tucson, AZ (US)

(73) Assignee: Raytheon Company, Waltham, MA (US)

( * ) Notice: Subject to any disclaimer, the term of this patent is extended or adjusted under 35 U.S.C. 154(b) by 149 days.

(21) Appl. No.: 12/323,967

(22) Filed: Nov. 26, 2008

(65) Prior Publication Data
US 2010/0128244 A1 May 27, 2010

(51) Int. Cl.
*G01C 1/00* (2006.01)
*G01C 3/08* (2006.01)
(52) U.S. Cl. .................................. 356/141.1; 356/4.01
(58) Field of Classification Search ............. 356/4.01; 382/103, 106
See application file for complete search history.

(56) References Cited

U.S. PATENT DOCUMENTS

| | | | |
|---|---|---|---|
| 6,268,944 B1 | 7/2001 | Szapiel | |
| 6,288,381 B1 | 9/2001 | Messina | |
| 7,308,342 B2 * | 12/2007 | Greenfeld et al. | 701/3 |
| 7,400,384 B1 * | 7/2008 | Evans et al. | 356/5.01 |
| 2003/0174315 A1 | 9/2003 | Byren et al. | |
| 2004/0075884 A1 | 4/2004 | Byren et al. | |
| 2008/0002176 A1 | 1/2008 | Krasutsky | |
| 2008/0042042 A1 | 2/2008 | King et al. | |

OTHER PUBLICATIONS

"International Application Serial No. PCT/US09/06189, Search Report mailed Feb. 1, 2010", 16 Pgs.
"International Application Serial No. PCT/US09/06189, Written Opinion mailed Feb. 1, 2010", 16 Pgs.

* cited by examiner

*Primary Examiner* — Isam Alsomiri
(74) *Attorney, Agent, or Firm* — Schwegman, Lundberg & Woessner, P.A.; Gregory J. Gorrie

(57) ABSTRACT

Embodiments of a gimbaled system with an optical coudé path and method for transferring data are generally described herein. In some embodiments, the gimbaled system includes optical coudé path to provide a data communication path with a gimbaled payload, an on-gimbal communication laser to transmit modulated camera data via the coudé path, and an off-gimbal communication detector to detect the camera data received via the coudé path. In some embodiments, the optical coudé path may include at least two mirrors to provide a bi-directional communication path through an azimuth axis and an elevation axis of the gimbaled payload.

18 Claims, 2 Drawing Sheets

GIMBALED SYSTEM WITH OPTICAL COUDÉ PATH AND METHOD TRANSFERRING DATA

TECHNICAL FIELD

Some embodiments pertain to gimbaled systems. Some embodiments pertain to gimbaled imaging systems. Some embodiments pertain to gimbaled laser imaging systems that use Laser Detection and Ranging (LADAR).

BACKGROUND

One issue with gimbaled systems is the transfer of data across the gimbal axes. Many conventional gimbaled systems use electrical slip rings or harnesses to transfer data cross the gimbal axes. For large amounts of data, electrical slip rings become more complex and may be less reliable. Harnesses become larger and induce undesired torque on the gimbaled system.

Thus, there are general needs for gimbaled systems and methods to transfer large amounts of data across the gimbal axes. There are also general needs for gimbaled systems and methods to transfer large amounts of data across the gimbal axes without the use of electrical slip rings or harnesses.

DETAILED DESCRIPTION

The following description and the drawings sufficiently illustrate specific embodiments to enable those skilled in the art to practice them. Other embodiments may incorporate structural, logical, electrical, process, and other changes. Examples merely typify possible variations. Individual components and functions are optional unless explicitly required, and the sequence of operations may vary. Portions and features of some embodiments may be included in, or substituted for, those of other embodiments. Embodiments set forth in the claims encompass all available equivalents of those claims.

Figure 1:
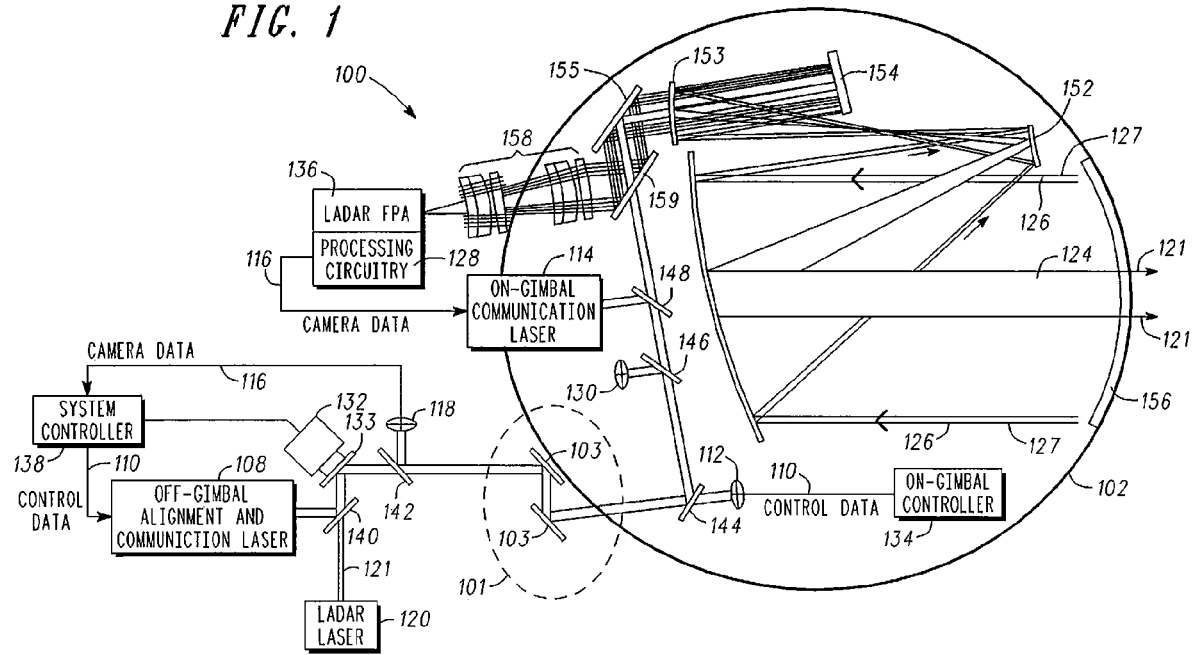
FIG. 1 illustrates a gimbaled system with an optical coudé path in accordance with some embodiments.

FIG. 1 illustrates a gimbaled system with an optical coudé path in accordance with some embodiments. Gimbaled system 100 includes a plurality of on-gimbal elements within gimbaled payload 102 and a plurality of off-gimbal elements located external to gimbaled payload 102. Gimbaled system 100 also includes optical coudé path 101 to provide a data communication path between some of the elements located on gimbaled payload 102 and some of the elements located off gimbaled payload 102. In some embodiments, gimbaled system 100 includes off-gimbal communication laser 108 to transmit information, such as modulated control data 110, via coudé path 101. Gimbaled system 100 may also include on-gimbal communication detector 112 to detect data, such as modulated control data 110, received across coudé path 101. Optical coudé path 101 allows large amounts of data to be transferred across gimbal axes without high data rate multi-channel electrical slip rings or torque inducing harnesses.

In some embodiments, optical coudé path 101 includes at least two mirrors 103 to provide a communication path through an azimuth axis and an elevation axis of gimbaled payload 102. In some embodiments, a bi-directional communication path may be provided, although the scope of the embodiments is not limited in this respect. These embodiments are discussed in more detail below.

In some embodiments, off-gimbal communication laser 108 may generate an auto-alignment beam to align transmit path 124 and receive path 126 of gimbaled system 100. The auto-alignment beam may be modulated to communicate control data 110 via coudé path 101. In these embodiments, gimbaled system 100 may also include alignment detector 130 to detect wavelengths of the auto-alignment beam to indicate when transmit path 124 and receive path 126 are aligned. In these embodiments, off-gimbal communication laser 108 serves as both a data communication laser and an auto-alignment laser. In some alternate embodiments, a separate auto-alignment laser may be used, which may be provided off gimbal or on gimbal. In some of these embodiments, auto alignment with ten micro-radians may be achieved to correct for cross gimbal errors, although the scope of the embodiments is not limited in this respect.

In some embodiments, gimbaled system 100 may also include on-gimbal communication laser 114 to transmit data, such as modulated camera data 116, via coudé path 101. Gimbaled system 100 may also include off-gimbal communication detector 118 to detect data, such as modulated camera data 116, received via coudé path 101. These embodiments may allow large amounts of video data to be transferred off gimbal via optical coudé path 101. In some embodiments, data transfer rates of up to 2 Giga-bits-per-second (Gbps) or greater may be achieved. In embodiments that include off-gimbal communication laser 108 and on-gimbal communication detector 112, a bi-directional communication of data may be achieved to allow command data 110 to be transferred on gimbal. In these embodiments, on-gimbal communication detector 112 and off-gimbal communication detector 118 may include circuitry to detect and demodulate the received laser wavelengths.

In some embodiments, gimbaled system 100 may include designator laser 120 configured to illuminate (i.e., designate) a target region by transmitting laser wavelengths 121 along transmit path 124. The target region may be on the ground (e.g., to designate a building or vehicle) or on a body of water (e.g., designate a watercraft or vessel).In these embodiments, gimbaled system 100 may be a laser designation system, although the scope of the embodiments is not limited in this respect. In some embodiments, designator laser 120 may be provided off-gimbal 102 and the laser wavelengths generated by designator laser 120 may be provided via coudé path 101.

In some embodiments, gimbaled system 100 may also include focal plane array (FPA) 128 to convert return laser wavelengths 127 received through receive path 126 to electrical signals. In some embodiments, gimbaled system 100 may also include on-gimbal processing circuitry 136 to generate data such as camera data 116 from the electrical signals for use in modulation of laser wavelengths generated by on-gimbal communication laser 114 for transmission via optical coudé path 101 to the off-gimbal communication detector 118. Laser wavelengths 127 received through receive path 126 may be received through lens 156 of gimbaled payload 102.

In some alternate embodiments, designator laser 120 may be configured as a Laser Detection and Ranging (LADAR) laser to transmit LADAR signals, which may include pulsed laser wavelengths for ranging and imaging. In these embodiments, camera data 116 may comprise LADAR data. In these embodiments, the LADAR signals may comprise pulsed laser wavelengths to simultaneously obtain target range information and target images. In these embodiments, camera data 116 may include video imaging and/or still photographic data from the target region. In these embodiments, gimbaled system 100 may be a laser imaging system, although the scope of the embodiments is not limited in this respect.

In some embodiments, control data 110 may include command signals to control one or more functional elements located on gimbaled payload 102. For example, control data 110 may be used to switch between one of a plurality of on-gimbal cameras provided on gimbaled payload 102. Control data 110 may also be used to control movement of gimbaled payload 102 within its pod. In some embodiments, control data 110 may be used to control movable optical elements located on gimbaled payload 102.

Gimbaled system 100 may also include system controller 138 located off gimbal to provide control data 110 to off-gimbal communication laser 108 for modulation and transmission via coudé path 101. Gimbaled system 100 may also include on-gimbal controller 134 to receive detected control data 110 from on-gimbal communication detector 112. System controller 138 may also be configured to receive detected camera data 116 from off-gimbal communication detector 118, although detected camera data 116 may be provided to other system elements not separately illustrated.

In some embodiments, on-gimbal controller 134 maybe configured to provide data, such as navigational data that may be obtained by navigational elements of gimbaled payload 102, to on-gimbal communication laser 114 for transmission via coudé path 101, although the scope of the embodiments is not limited in this respect. For clarity, the signal path between on-gimbal controller 134 and on-gimbal communication laser 114 is not separately illustrated.

On-gimbal controller 134 may also be configured to receive an indication from alignment detector 130 when alignment is detected and may provide the indication via coudé path 101, although the scope of the embodiments is not limited in this respect. For clarity, the signal path between on-gimbal controller 134 and alignment detector 130 is not separately illustrated.

As illustrated in FIG. 1, gimbaled system 100 may include various optical elements to combine and/or separate the various laser wavelengths for performing the functions described herein. In some embodiments, gimbaled system 100 may include beam combiner 140 located off gimbal to combine laser wavelengths generated by off-gimbal communication laser 108 with laser wavelengths generated by designator laser 120 (or in some embodiments the LADAR laser) for subsequent transmission via coudé path 101.

Gimbaled system 100 may also include beam splitter 142 located off gimbal to direct laser wavelengths generated by on-gimbal communication laser 114 carrying camera data 116 received via coudé path 101 to off-gimbal communication detector 118.

Gimbaled system 100 may also include beam splitter 144 located on gimbal to direct laser wavelengths generated by off-gimbal communication laser 108 carrying control data 110 received via coudé path 101 to on-gimbal communication detector 112. Beam splitter 144 may be configured to direct a portion of the laser wavelengths carrying control data 110 to on-gimbal communication detector 112 and to direct another portion of the laser wavelengths that comprise the auto-alignment beam to alignment detector 130. In these embodiments, the laser wavelengths carrying the control data 110 are also used as the auto alignment beam. Beam splitter 144 accordingly directs a portion of the energy to on-gimbal communication detector 112 and a portion of the energy for direction to alignment detector 130.

Gimbaled system 100 may also include beam combiner 148 located on gimbal to provide laser wavelengths generated by on-gimbal communication laser 114 for subsequent transmission via coudé path 101. In these embodiments, beam combiner 148 may be configured to allow passage of laser wavelengths generated by LADAR laser 120 received via coudé path 101.

Gimbaled system 100 may also include beam splitter 146 located on gimbal to direct wavelengths of the auto-alignment beam generated by off-gimbal communication laser 108 to alignment detector 130. Beam splitter 146 may also be configured to allow wavelengths generated by on-gimbal communication laser 114 to pass.

In these embodiments, beam splitters 142, 144, 146 and beam combiners 140 and 148 may include reflective and/or transmissive elements with optical coatings selected to perform the functions described herein. For example, optical coatings may be selected to allow one or more laser wavelengths to be reflected and to allow one or more other laser wavelengths to pass through. In some cases, the optical coatings may be selected to allow a portion of the energy of one or more laser wavelengths to be reflected and to allow another portion of the energy of these laser wavelengths to pass.

In some embodiments, referred to as different-wavelength embodiments, on-gimbal communication laser 114 and off-gimbal communication laser 108 transmit modulated data at different laser wavelengths. In these different-wavelength embodiments, beam splitters 142, 144, 146 and beam combiners 140 and 148 may be appropriately configured based on the different laser wavelengths on-gimbal communication laser 114 and off-gimbal communication laser 108. In these different-wavelength embodiments, beam splitters 142, 144, and 146 may be configured to either pass or reflect substantially all of a predetermined laser wavelength so that little or no undesired energy would go where it is not intended. Beam combiner 140 may be configured to reflect substantially all energy of the wavelengths generated by off-gimbal communication laser 108 and transmit the wavelengths generated by LADAR laser 120. Beam splitter 144 may be configured to transmit the wavelengths generated by off-gimbal communication laser 108 to on-gimbal communication detector 112 and reflect the wavelengths generated by LADAR laser 102 to an illuminator. In these different-wavelength embodiments, beam combiner 148 may be configured to reflect the wavelengths generated by on-gimbal communication laser 114 and transmit the wavelengths generated by LADAR laser 102 to the illuminator as shown. Beam splitter 144 may additionally be configured to reflect the wavelengths generated by on-gimbal communication laser 114 via optical coudé path 101 to off-gimbal communication detector 118. In these different-wavelength embodiments, beam splitter 142 may be configured to reflect the wavelengths generated by on-gimbal communication laser 114 and transmit the wavelengths generated by LADAR laser 102.

In some embodiments, referred to as same-wavelength embodiments, on-gimbal communication laser 114 and off-gimbal communication laser 108 transmit modulated data at the same laser wavelengths. In these same-wavelength embodiments, beam splitters 142, 144, 146 and beam combiners 140 and 148 may be configured based on the same laser wavelengths generated by on-gimbal communication laser 114 and off-gimbal communication laser 108. In these same-wavelength embodiments, beam splitters 142 and 144 may be configured to be partially reflective at the wavelengths used by off-gimbal communication laser 108 and on-gimbal communication laser 114. For example, beam splitters 142 and 144 may be configured to reflect approximately 50% of the energy and transmit approximately 50% of the energy of these wavelengths, although the scope of the embodiments is not limited in this respect. The transmissions by off-gimbal communication laser 108 and on-gimbal communication laser 114 may be timed and/or rotated to allow on-gimbal communication detector 112 to detect the modulated wavelengths from off-gimbal communication laser 108 and to allow off-gimbal communication detector 118 to separately detect the modulated wavelengths from on-gimbal communication laser 114. In some of these same-wavelength embodiments, on-gimbal communication detector 112 may be shielded or turned off when on-gimbal communication laser 114 is transmitting, and off-gimbal communication detector 118 may be shielded or turned off when off-gimbal communication laser 108 is transmitting, although the scope of the embodiments is not limited in this respect.

Gimbaled system 100 may also include beam steering circuitry 132 located off gimbal configured to control beam steering mirror 133. Beam steering circuitry 132 may be responsive to signals from system controller 138 to align laser wavelengths generated by designator laser 120 and wavelengths generated by the off-gimbal communication laser 108 with coudé path 101.

In some embodiments, gimbaled system 100 may include elements of an optical telescope such as primary reflector 151, secondary reflector 152, tertiary reflector 153, and quaternary reflector 154. In these embodiments, primary reflector 151, secondary reflector 152, tertiary reflector 153, and quaternary reflector 154 may direct laser wavelengths from designator laser 120 or the LADAR laser at a target region and may direct return laser wavelengths 127 received from the target region to LADAR FPA 128. In these embodiments, gimbaled payload may include reflective elements 155 and 159 to reflect wavelengths as illustrated and optical elements 158 to direct and/or focus return laser wavelengths 127 on LADAR FPA 136. Reflective element 159 may comprise a mirror with a hole to allow laser wavelengths 121 from LADAR laser 120 to pass.

Although FIG. 1 illustrates embodiments of a three-mirror telescope imager, the scope of the invention is not limited in this respect. Other embodiments are applicable to two-mirror telescopes as well as refractive telescopes and imaging devices.

In some embodiments, a method of transferring large amounts of data across gimbal axes without high data rate multi-channel electrical slip rings or torque inducing harnesses is provided. In these embodiments, optical coudé path 101 may be provided within gimbaled payload 102. Camera data 116 may be modulated with on-gimbal communication laser 114, and the modulated camera data may be directed via optical coudé path 101 to off-gimbal communication detector 118. In some embodiments, an auto-alignment beam may be directed via optical coudé path 101 from off-gimbal to an auto alignment detector located on-gimbal. Off-gimbal communication laser 108 may generate the auto alignment beam and control data control data 110 may be modulated with on-gimbal communication laser 108. The modulated control data may be directed via coudé path 101 for detection by on-gimbal communication detector 112. The control data may control one or more on-gimbal elements of gimbaled system 102.

In some embodiments, LADAR wavelengths may be directed via coudé path 101 to a plurality of on-gimbal reflectors to image a target region. Return LADAR wavelengths from the target region may be directed to LADAR FPA 128 to generate the camera data. The camera data may comprises target range and imaging data for transmission off gimbal via the optical coudé path 101.

In FIG. 1, LADAR FPA 136, optical elements 158 and processing circuitry 128 are shown outside gimbaled payload 102 for illustrative purposes. In actual embodiments, LADAR FPA 136, optical elements 158 and processing circuitry 128 are located on-gimbal.

Figure 2:
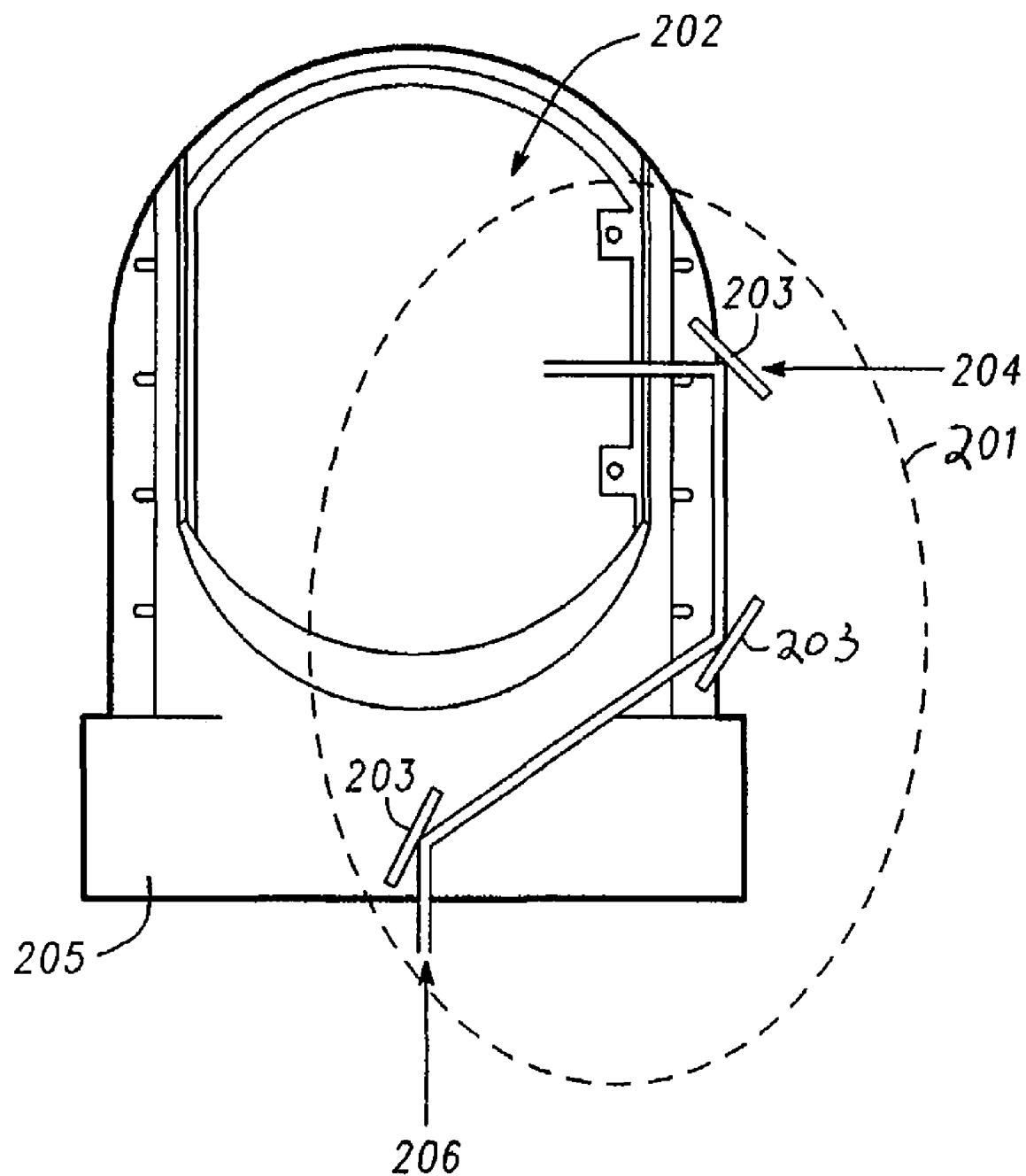
FIG. 2 illustrates a pod which may hold a gimbaled system with an optical coudé path in accordance with some embodiments.

FIG. 2 illustrates a pod which may hold a gimbaled system with an optical coudé path in accordance with some embodiments. Gimbaled payload 202 may be provided in pod 205, which may be mounted on the underside of an aircraft (e.g., a helicopter or plane), although the scope of the embodiments is not limited in this respect. Optical coudé path 201 may provide a data communication path with a gimbaled payload 202. In these embodiments, gimbaled payload 202 may correspond to gimbaled payload 102 (FIG. 1), optical coudé path 201 may correspond to optical coudé path 101 (FIG. 1, and mirrors 203 may correspond to mirrors 103 (FIG. 1).

In these embodiments, optical coudé path 201 may include three mirrors 203 to provide a communication path through azimuth axis 206 and elevation axis 204 of gimbaled payload 202. In this way, gimbaled payload 102 may rotate in azimuth without restriction to provide greater than 360 degrees of continuous rotations. In some embodiments, optical coudé path 201 may be provided through holes in the center of bearings of azimuth axis 206 and elevation axis 204 of gimbaled payload 202, although the scope of the embodiments is not limited in this respect. In some embodiments, prisms may be used instead of mirrors 203.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. A gimbaled system comprising:
    an optical coudé path to provide a bi-directional data communication path with a gimbaled payload;
    an off-gimbal communication laser to transmit modulated control data on an auto-alignment beam via the coudé path; and
    an on-gimbal communication detector to detect the control data received across the coudé path;
    an on-gimbal communication laser to transmit modulated data generated from one or more functional elements of the gimbaled payload via the coudé path; and
    an off-gimbal communication detector to detect the modulated data transmitted by the on-gimbal communication laser and received via the coudé path,
    wherein the off-gimbal communication laser is configured to generate the auto-alignment beam to align the coudé path, the auto-alignment beam being modulated to communicate the control data via the coudé path, the control data including command signals to control one or more functional elements of the gimbaled payload.

2. The system of claim 1 wherein the optical coudé path includes at least two mirrors to provide a bi-directional communication path through an azimuth axis and an elevation axis of the gimbaled payload.

3. The system of claim 1
    further comprising an alignment detector to detect wavelengths of the auto-alignment beam to indicate when the transmit and receive paths are aligned.

4. The system of claim 3 wherein the modulated data transmitted by the
an on-gimbal communication laser comprises camera data.
5. The system of claim 4 further comprising:
a designator laser configured to illuminate a target region by transmitting laser wavelengths along the transmit path; and
a focal plane array (FPA) to convert return laser wavelengths received through the receive path to electrical signals; and
on-gimbal processing circuitry to generate the camera data from the electrical signals for use in modulation of laser wavelengths generated by the on-gimbal communication laser for transmission via the optical coudé path to the off-gimbal communication detector.
6. The system of claim 5 wherein the designator laser is provided off-gimbal and the laser wavelengths generated by the designator laser are provided via the coudé path.
7. The system of claim 6 wherein the designator laser is configured as a Laser Detection and Ranging (LADAR) laser to transmit LADAR signals, and
wherein the camera data further comprises target range and imaging information data.
8. The system of claim 4 wherein the control data includes command signals to switch between one of a plurality of on-gimbal cameras provided on the gimbaled payload and control signals to control movement of the gimbaled payload within a pod.
9. The system of claim 8 further comprising:
a system controller located off gimbal to provide the control data to the off-gimbal communication laser for modulation and transmission via the coudé path; and
an on-gimbal controller to receive detected control data from the on-gimbal communication detector.
10. The system of claim 9 wherein the on-gimbal controller is configured to provide navigation data obtained by the gimbaled payload to the on-gimbal communication laser for transmission via the coudé path, and
wherein the on-gimbal controller is configured to receive an indication from the alignment detector when alignment is detected and provide the indication via the coudé path.
11. The system of claim 10 further comprising beam steering circuitry located off gimbal configured to control a beam steering mirror to align the laser wavelengths generated by the LADAR laser and wavelengths generated by the off-gimbal communication laser with the coudé path.
12. The system of claim 4 further comprising:
a first beam combiner located off gimbal to combine laser wavelengths generated by the off-gimbal communication laser with laser wavelengths generated by a Laser Detection and Ranging (LADAR) laser for subsequent transmission via the coudé path;
a first beam splitter located off gimbal to direct laser wavelengths carrying the camera data received via the coudé path to the off-gimbal communication detector;
a second beam splitter located on gimbal to direct laser wavelengths carrying the control data received via the coudé path to the on-gimbal communication detector;
a second beam combiner located on gimbal to provide laser wavelengths generated by the on-gimbal communication laser for subsequent transmission via the coudé path,
wherein the second beam combiner is configured to allow passage of laser wavelengths generated by the LADAR laser received via the coudé path.

13. The system of claim 12 further comprising a third beam splitter located on gimbal to direct wavelengths of the auto-alignment beam to the alignment detector,
wherein the second beam splitter is configured to direct a portion of the laser wavelengths carrying the control data to the on-gimbal communication detector and configured to direct another portion of the laser wavelengths that comprise the auto-alignment beam to the alignment detector.
14. The system of claim 4 wherein the on-gimbal communication laser and the off-gimbal communication laser transmit modulated data at a same laser wavelength.
15. The system of claim 4 wherein the on-gimbal communication laser and the off-gimbal communication laser transmit modulated data at different laser wavelengths.
16. A method of transferring data across gimbal axes comprising:
providing an optical coudé path to provide a bi-directional data communication path with a gimbaled payload;
transmitting modulated camera data with an on-gimbal communication laser
via the optical coudé path to an off-gimbal communication detector;
directing an auto-alignment beam via the optical coudé path from off-gimbal to an auto alignment detector located on-gimbal; and
modulating control data on the auto alignment beam and transmitting the modulated control data via the coude path for detection by an on-gimbal communication detector, the control data being configured to control one or more on-gimbal elements of the gimbaled system,
wherein an off-gimbal communication laser is configured to generate the auto-alignment beam to align the coudé path.
17. The method of claim 16 further comprising:
directing Laser Detection and Ranging (LADAR) wavelengths via the coudé path to a plurality of on-gimbal reflectors to image a target region; and
directing return LADAR wavelengths from the target region to a LADAR focal plane array to generate the camera data,
wherein the camera data comprises target range and imaging data for transmission off gimbal via the optical coudé path.
18. A laser imaging system comprising:
an optical coudé path including at least two mirrors to provide a bi-directional communication path through an azimuth axis and an elevation axis of a gimbaled payload;
an off-gimbal communication laser to transmit modulated control data on an auto-alignment beam via the coudé path;
an on-gimbal communication detector to detect the control data received across the coudé path;
an on-gimbal communication laser to transmit modulated camera data from an on-gimbal source via the coudé path;
an off-gimbal communication detector to detect the camera data received via the coudé path,
a Laser Detection and Ranging (LADAR) laser located off gimbal configured to image a target region by transmitting LADAR wavelengths via the optical coudé path to on-gimbal reflectors; and
a focal plane array (FPA) to convert return laser wavelengths received through the on-gimbal reflectors to electrical signals for generating the camera data, wherein the off-gimbal communication laser is configured to generate the auto-alignment beam to align the coudé path, the auto-alignment beam being modulated to communicate the control data via the coudé path, the control data including command signals to control one or more functional elements of the gimbaled payload.

* * * * *

UNITED STATES PATENT AND TRADEMARK OFFICE
CERTIFICATE OF CORRECTION

| | | |
|---|---|---|
| PATENT NO. | : 7,929,125 B2 | Page 1 of 1 |
| APPLICATION NO. | : 12/323967 | |
| DATED | : April 19, 2011 | |
| INVENTOR(S) | : Frederick B. Koehler et al. | |

It is certified that error appears in the above-identified patent and that said Letters Patent is hereby corrected as shown below:

In column 3, line 25, delete "maybe" and insert -- may be --, therefor.

In column 7, line 3, in Claim 4, delete "an on-gimbal" and insert -- on-gimbal --, therefor.

Signed and Sealed this
Seventh Day of June, 2011

David J. Kappos
*Director of the United States Patent and Trademark Office*